Oct. 31, 1961           L. GAMBONI           3,006,394
METHOD OF MAKING LASTS FOR FOOTWEAR AND DEVICE THEREFOR
Filed June 7, 1960           2 Sheets-Sheet 1
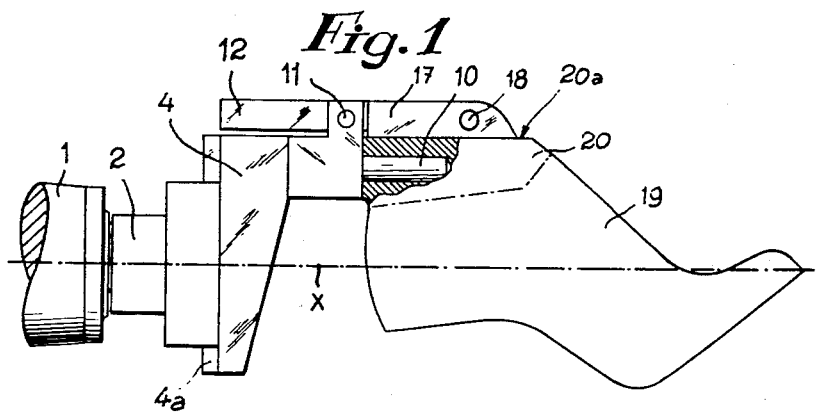
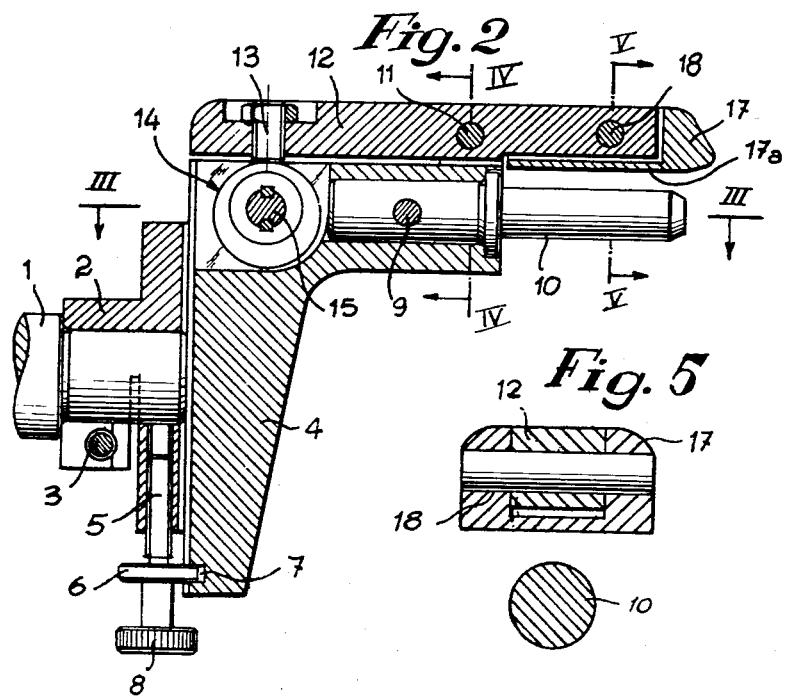

United States Patent Office 3,006,394
Patented Oct. 31, 1961

3,006,394
METHOD OF MAKING LASTS FOR FOOTWEAR AND DEVICE THEREFOR
Leonello Gamboni, Milan, Italy, assignor to Incoma S.p.A., Milan, Italy
Filed June 7, 1960, Ser. No. 34,428
Claims priority, application Italy June 13, 1959
2 Claims. (Cl. 144—325)

This invention refers to turning of shoe lasts. Turning is usually effected by holding a wooden blank between a mandrel and a tailstock.

This process necessitates after turning of the blank an additional work for removing the centering portions. During this additional operation the accurate profile of the last is deformed.

The invention obviates the above drawback.

The method consists in holding the blank in overhanging condition on the mandrel of the lathe at an ankle extension on the blank, in machining by turning the whole last except the ankle extension and finally removing the latter by a milling operation. Removal of the ankle extension is best effected by milling, the remainder of the last being entirely manufactured by turning which ensures accuracy of the desired profile.

Further features and advantages of this invention will be understood from the appended description referring to the accompanying drawing which shows diagrammatically by way of a non-limiting example a device for carrying out the improved method.

FIG. 1 is an elevational view of a last assembled on a fitting fitted to the mandrel of a lathe on completion of the turning operation.

FIG. 2 is an axial sectional view of the fitting without the last.

FIG. 5 is a sectional view on line V—V of FIGURE 2.

Figure 3:
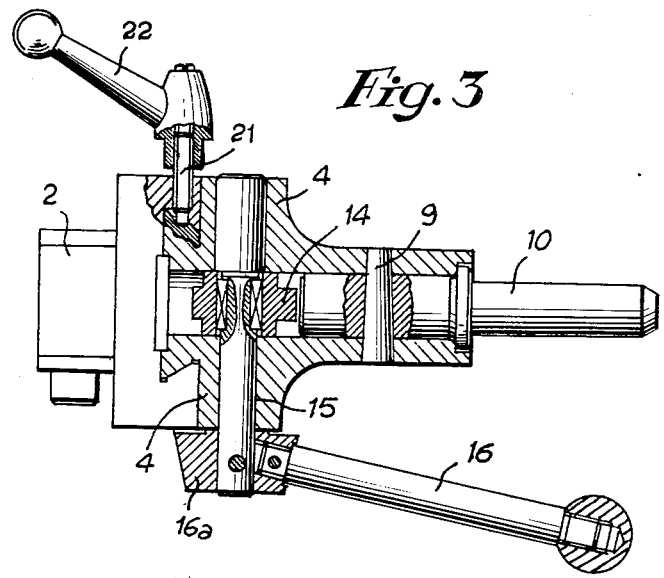
FIG. 3 is a sectional view on line III—III of FIG. 2.
Figure 4:
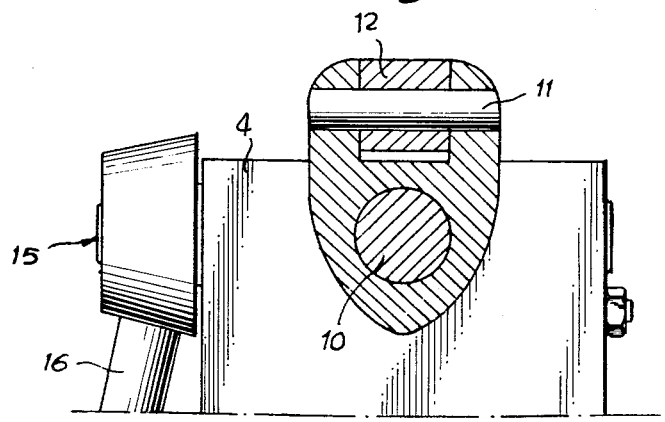
FIG. 4 is a sectional view on linee IV—IV of FIG. 2.

Reference 1 denotes the mandrel of the lathe having a collar 2 clamped to its end by means of a vice and set screw 3.

Reference 4 denotes the body of the fitting and has two legs defining a right angle, one leg being provided with dovetailed guideways 4a sliding on corresponding guideways on the collar 2 transversely to the axis X of the mandrel. Transverse adjustment of the body 4 with respect to the collar 2 is effected by a screw 5 radially screwed into the collar 2 and by means of a collar 6 which is engaged in a groove 7 in the body 4 and is provided with a hand wheel 8.

The desired position is retained by means of a lock screw 21 controlled by a lever 22.

The body 4 is formed with an axially directed cylindrical seat having secured therein by means of a pin 9 a bolt 10 supporting the last.

The body 4 has pivoted thereto by means of a pivot 11 a beam 12 having a rear screw 13 acted upon by a cam 14 mounted on a shaft 15 rotatable in the body 4.

A shaft 15 has keyed thereto a hub 16a of a control lever 16. A U-shaped element 17 is articulated about a pivot 18 at the forward end of the beam 12 and is formed with a lower flat 17a.

At last 19 is formed with an ankle extension 20 formed with a recess receiving the bolt 10 carried by the body 4.

The device operates as follows:

The body 4 is transversely adjusted with respect to the collar 2 whereupon the blank is clamped to the body 4 by fitting it on the bolt 10 and pressing on the top flat 20a on the ankle extension 20 the lower flat 17a on the U-shaped member 17. Locking pressure is generated by swinging the beam 12 clockwise (FIG. 2) about the pivot 11 by means of the cam 14 controlled by the lever 16.

The blank is then turned to the desired profile shown in FIGURE 1.

The last is thereupon removed from the fitting 4 by actuating the lever 16 in order to relieve pressure between the flats 17a and 20a, whereupon the last 19 is disassembled from the fitting and the ankle extension 20 is removed by milling.

The resulting last is of the strictly required profile, as distinct from lasts turned by methods adopted heretofore.

It will be understood that, the principle of the invention being left unaltered, constructional details of the device can be widely varied from the example described and shown without departing from the scope of this invention.

What I claim is:

1. Method of turning a complete last for a shoe from a longitudinally extending blank having a vertical ankle extension defining a blind hole, said hole extending longitudinally into said ankle extension toeward from above the heel part of the blank, said method comprising; supporting the blank on the mandrel of a lathe by means of a longitudinal bolt extending into said hole; clamping the blank on the bolt by means contacting said ankle extension only; machining the blank entirely by turning, excepting said ankle extension; and removing said ankle extension by machining, whereby the surfaces of said last that contact said shoe are maintained in the shape of the finished last as originally turned.

2. Apparatus, including a lathe having a mandrel with an axis of rotation, for manufacturing, from a longitudinally extending blank, a complete last for a shoe, said blank having a vertical ankle extension with a longitudinal hole therein that is removed after manufacture of the last is complete, said apparatus comprising: a collar having fantail guideways and a tap, both normal to the axis of rotation of said mandrel, said collar for attachment to said mandrel; a clamping vice for clamping said collar to said mandrel; a body having legs defining a right angle, one said leg having a longitudinal cylindrical seat recessed in its free end, the junction of said legs having a transverse cylindrical hole, and the other said leg having fantail guideways complementary to those of said collar for slidably engaging therewith; means engaging in said collar tap and with said other leg for adjusting the depth of engagement of said complementary fantail guideways to adjust the offset of said one leg from the mandrel; a support bolt pinned in said longitudinal cylindrical seat of said one leg, said bolt extending beyond the end of said one leg for engaging in the hole in said ankle extension and thereby supporting said blank thereon; a beam having oppositely disposed ends and arranged to extend parallel to and slightly less than the length of said one leg and the bolt part extending from said one leg, said beam being pivotally mounted intermediate said oppositely disposed ends on said one leg; a U-shaped (in cross-section) member articulated to said beam and extending its end just beyond the end of said support bolt; eccentric means rotatably mounted in said transverse hole in the junction of said legs, said eccentric means engaging the adjacent part of said beam for adjustably pivoting said beam and articulated member to clamp and unclamp said blank on said bolt, whereby said blank is held in said lathe by a part of the blank that is unconnected with any surface of the finished last that will be in contact with the shoe for which the last was made.

References Cited in the file of this patent

UNITED STATES PATENTS

| | | |
|---|---|---|
| 912,027 | Prindle | Feb. 9, 1909 |
| 1,226,825 | Stewart | May 22, 1917 |
| 2,735,460 | Clausing | Feb. 21, 1956 |